(12) United States Patent
Moon et al.

(10) Patent No.: US 11,548,144 B2
(45) Date of Patent: Jan. 10, 2023

(54) ROBOT AND CONTROLLING METHOD THEREOF

(71) Applicant: LG ELECTRONICS INC., Seoul (KR)

(72) Inventors: Yoonji Moon, Seoul (KR); Joonwoo Park, Seoul (KR); Egun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 341 days.

(21) Appl. No.: 16/799,013

(22) Filed: Feb. 24, 2020

(65) Prior Publication Data

US 2021/0039251 A1 Feb. 11, 2021

(30) Foreign Application Priority Data

Aug. 8, 2019 (KR) .................. 10-2019-0096482

(51) Int. Cl.
| | |
|---|---|
| *B25J 9/16* | (2006.01) |
| *B25J 11/00* | (2006.01) |
| *B25J 19/02* | (2006.01) |
| *G06N 20/00* | (2019.01) |
| *G06K 9/62* | (2022.01) |
| *G06V 20/10* | (2022.01) |
| *G06V 40/18* | (2022.01) |
| *G06V 40/16* | (2022.01) |

(52) U.S. Cl.
CPC ............ *B25J 9/161* (2013.01); *B25J 9/1697* (2013.01); *B25J 11/0005* (2013.01); *B25J 19/023* (2013.01); *G06K 9/6262* (2013.01); *G06N 20/00* (2019.01); *G06V 20/10* (2022.01); *G06V 40/174* (2022.01); *G06V 40/18* (2022.01)

(58) Field of Classification Search
USPC .................................................. 700/245–264
See application file for complete search history.

(56) References Cited

U.S. PATENT DOCUMENTS

| | | | |
|---|---|---|---|
| 10,898,999 B1* | 1/2021 | Cohen ................... | B25J 9/0003 |
| 11,358,285 B2* | 6/2022 | Moon .................. | G06N 3/0454 |
| 2015/0336276 A1* | 11/2015 | Song ...................... | B25J 9/0003 |
| | | | 901/1 |
| 2017/0206064 A1* | 7/2017 | Breazeal ................. | G06F 8/34 |
| 2017/0318227 A1* | 11/2017 | Hsu .................... | H04N 5/23219 |
| 2017/0344106 A1* | 11/2017 | Cohen .................... | G06F 3/013 |
| 2018/0121784 A1* | 5/2018 | Ichiboshi .............. | G16H 10/20 |
| 2018/0204111 A1* | 7/2018 | Zadeh .................. | G06N 3/0436 |
| 2018/0301053 A1* | 10/2018 | Boccanfuso ........... | A63H 3/006 |

(Continued)

FOREIGN PATENT DOCUMENTS

| | | |
|---|---|---|
| KR | 10-2017-0115200 A | 10/2017 |
| KR | 10-2018-0079825 A | 7/2018 |
| KR | 10-2018-0098458 A | 9/2018 |

*Primary Examiner* — Jonathan L Sample
(74) *Attorney, Agent, or Firm* — Birch, Stewart, Kolasch & Birch, LLP

(57) ABSTRACT

Disclosed herein is a robot including an output interface including at least one of a display or a speaker, a camera, and a processor controlling the output interface to output content, acquiring an image including a user through the camera while the content is output, detecting an over-immersion state of the user based on the acquired image, and controlling an operation of releasing over-immersion when the over-immersion state is detected.

20 Claims, 10 Drawing Sheets

(56) References Cited

U.S. PATENT DOCUMENTS

| | | | | |
|---|---|---|---|---|
| 2018/0370032 A1* | 12/2018 | Ichikawa | ............. | G06V 40/174 |
| 2019/0070735 A1* | 3/2019 | Tappeiner | ............... | G10L 17/00 |
| 2019/0118386 A1* | 4/2019 | Okumura | ............... | B25J 9/1689 |
| 2019/0220091 A1* | 7/2019 | Yu | ......................... | G06F 1/1601 |
| 2019/0279070 A1* | 9/2019 | Hayashi | ............... | B25J 11/0015 |
| 2019/0295526 A1* | 9/2019 | Ichikawa | ............. | B25J 11/0005 |
| 2019/0358428 A1* | 11/2019 | Wang | ..................... | B25J 9/1676 |
| 2020/0075007 A1* | 3/2020 | Kawahara | ............... | G10L 15/22 |
| 2020/0206940 A1* | 7/2020 | Takada | .................. | B25J 9/1694 |

* cited by examiner

ROBOT AND CONTROLLING METHOD THEREOF

CROSS-REFERENCE TO RELATED APPLICATIONS

The present application claims the priority benefit under 35 U.S.C. § 119 and 35 U.S.C. § 365 to Korean Patent Application No. 10-2019-0096482 filed in the Republic of Korea on Aug. 8, 2019, which is hereby incorporated by reference in its entirety for all purposes as fully set forth herein.

BACKGROUND

The present disclosure relates to a robot and a method of controlling the same.

A robot can refer to a machine that automatically processes or operates a given task by its own ability. The application fields of robots are generally classified into industrial robots, medical robots, aerospace robots, and underwater robots. Recently, communication robots that can communicate with humans by voices or gestures have been increasing (that is, communication robots are being increasingly used).

Such communication robots can include various types of robots, such as a guidance robot disposed at a particular place to show various types of information to users, and a home robot provided in the home. In addition, the communication robots can include an educational robot for guiding or assisting the study of a learner (e.g., user) through interaction with the learner.

The communication robot can provide various content according to a user's request. For example, the communication robot can output content in the form of a graphics through a display.

Meanwhile, a user being over-immerged in content provided through (e.g., by) a robot can adversely affect the emotion or health of the user. In particular, when the user is an infant or a child, over-immersion in the content can cause decreased vision or impaired emotion (e.g., emotional) development.

SUMMARY

An object of the present disclosure is to provide a robot for detecting an over-immersion state of a user while content is output and performing operation of releasing over-immersion.

According to an embodiment, a robot includes an output interface including at least one of a display or a speaker, a camera, and a processor configured to control the output interface to output content, acquire an image including a user through the camera while the content is output, detect an over-immersion state of the user based on the acquired image, and control operation of releasing over-immersion when the over-immersion state is detected.

In some embodiments, the robot can further include an emotion recognizer trained to recognize emotion (e.g., emotional state) of the user from input data, and the processor can recognize the emotion of the user from the image through the emotion recognizer and detect the over-immersion state based on the recognized emotion.

The emotion recognizer can include at least one recognizer implemented through deep learning.

The acquired image can include a video or a plurality of still images acquired at predetermined time points (e.g., respectively acquired at the predetermined time points).

The processor can periodically or continuously recognize the emotion of the user from the acquired image through the emotion recognizer and detect that (e.g., whether) the user is in an over-immersion state when the recognized emotion is identical during a reference time or more.

In some embodiments, the processor can track a gaze of the user from the acquired image and detect the over-immersion state based on a result of tracking.

The processor can detect that the user is in an over-immersion state, upon detecting that a position of the gaze is constant during a reference time or more.

In some embodiments, the processor can acquire display position change information of a graphical user interface (GUI) in the content output through the display and detect that the user is in an over-immersion state, when a position change of the GUI based on the acquired display position change information corresponds to a gaze position change of the user detected according to tracking of the gaze during a reference time or more.

In some embodiments, the processor can measure the number of eye blinks of the user from the acquired image during a reference time (e.g., a reference time period) and detect that the user is in an over-immersion state, when the measured number of eye blinks is less than a reference number. That is, the processor can determine whether the user is in the over-immersion state based on the number of eye blinks.

The robot can further include a communication transceiver for connection with a server, and the processor can transmit the acquired image to the server through the communication transceiver, receive over-immersion detection information from the server, when the over-immersion state of the user is detected by the server, and control operation of releasing over-immersion in response to the received over-immersion detection information.

In some embodiments, when the over-immersion state is detected, the processor can display a touch item through the display and output a message for inducing touch of the touch item through the speaker.

In some embodiments, the robot can further include at least one of a first motor configured to rotate the robot or a second motor configured to tilt the robot, and, when the over-immersion state is detected, the processor can control driving at least one of the first motor or the second motor.

In some embodiments, when the over-immersion state is detected, the processor can transmit, to a terminal, a notification indicating that the user is in an over-immersion state (e.g., the terminal can be separate from the robot and can be controlled by a different user).

According to another embodiment, a method of controlling a robot includes outputting content through at least one of a display or a speaker, acquiring an image including a user through a camera while the content is output, detecting an over-immersion state of the user based on the acquired image, and controlling operation of releasing over-immersion of the user when the over-immersion state is detected.

DETAILED DESCRIPTION OF THE EMBODIMENTS

Figure 1:
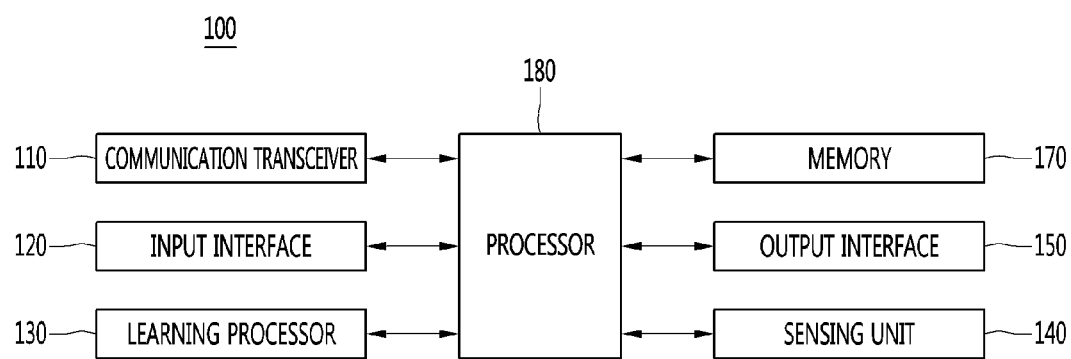
FIG. 1 illustrates an AI device including a robot according to an embodiment of the present disclosure.

Description will now be given in detail according to embodiments disclosed herein, with reference to the accompanying drawings. The accompanying drawings are used to help easily understand the embodiments disclosed in this specification and it should be understood that the embodiments presented herein are not limited by the accompanying drawings. As such, the present disclosure should be construed to extend to any alterations, equivalents and substitutes in addition to those which are particularly set out in the accompanying drawings.

A robot can refer to a machine that automatically processes or operates a given task by its own ability. In particular, a robot having a function of recognizing an environment and performing a self-determination operation can be referred to as an intelligent robot.

Robots can be classified into industrial robots, medical robots, home robots, military robots, and the like according to the use, purpose or field.

The robot includes a driving unit, the driving unit can include an actuator or a motor and can perform various physical operations, such as moving a robot joint. In addition, the driving unit of a movable robot can include a wheel, a brake, a propeller, and the like, and the movable robot can travel on the ground by the driving unit or fly in the air by the driving unit.

Artificial intelligence refers to the field of studying artificial intelligence or methodology for making artificial intelligence, as known in the related art, and machine learning refers to the field of defining various issues dealt with in the field of artificial intelligence and studying methodology for solving the various issues, as known in the related art. Machine learning is defined as an algorithm that enhances the performance of a certain task through a steady experience with the certain task, as known in the related art.

An artificial neural network (ANN) is a model used in machine learning and can mean a whole model of problem-solving ability, which is composed of artificial neurons (nodes) that form a network by synaptic connections. The artificial neural network can be defined by a connection pattern between neurons in different layers, a learning process for updating model parameters, and an activation function for generating an output value.

The artificial neural network can include an input layer, an output layer, and optionally one or more hidden layers. Each layer includes one or more neurons, and the artificial neural network can include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network can be to determine the model parameters that minimize a loss function. The loss function can be used as an index to determine optimal model parameters in the learning process of the artificial neural network.

Machine learning can be classified into supervised learning, unsupervised learning, and reinforcement learning according to a learning method.

The supervised learning can refer to a method of learning an artificial neural network in a state in which a label for learning data is given, and the label can mean the correct answer (or result value) that the artificial neural network must infer when the learning data is input to the artificial neural network. The unsupervised learning can refer to a method of learning an artificial neural network in a state in which a label for learning data is not given. The reinforcement learning can refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device including a robot according to an embodiment of the present disclosure. All components of various devices and systems including an AI system, an AI device, a robot, a server, etc. according to all embodiments of the present disclosure are operatively coupled and configured.

The AI device 100 can be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 can include a communication transceiver 110, an input interface 120, a learning processor 130, a sensing unit 140, an output interface 150, a memory 170, and a processor 180.

The communication transceiver 110 can transmit and receive data to and from external devices such as other AI devices 100a to 100e and the AI server 200 by using wire/wireless communication technology. For example, the communication transceiver 110 can transmit and receive sensor information, a user input, a learning model, and a control signal to and from external devices.

The communication technology used by the communication transceiver 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee™, NFC (Near Field Communication), and the like.

The input interface 120 can acquire various kinds of data.

At this time, the input interface 120 can include a camera for inputting a video signal, a microphone for receiving an audio signal, and a user input interface for receiving information from a user. The camera or the microphone can be treated as a sensor, and the signal acquired from the camera or the microphone can be referred to as sensing data or sensor information.

The input interface 120 can acquire a learning data for model learning and an input data to be used when an output is acquired by using learning model. The input interface 120 can acquire raw input data. In this case, the processor 180 or the learning processor 130 can extract an input feature by preprocessing the input data.

The learning processor 130 can learn a model composed of an artificial neural network by using learning data. The learned artificial neural network can be referred to as a learning model. The learning model can be used to an infer result value for new input data rather than learning data, and the inferred value can be used as a basis for determination to perform a certain operation.

At this time, the learning processor 130 can perform AI processing together with the learning processor 240 of the AI server 200.

At this time, the learning processor 130 can include a memory integrated or implemented in the AI device 100. Alternatively, the learning processor 130 can be implemented by using the memory 170, an external memory directly connected to the AI device 100, or a memory held in an external device.

The sensing unit 140 can acquire at least one of internal information about the AI device 100, ambient environment information about the AI device 100, and user information by using various sensors.

Examples of the sensors included in the sensing unit 140 can include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 can generate an output related to a visual sense, an auditory sense, or a haptic sense.

At this time, the output interface 150 can include a display for outputting time information, a speaker for outputting auditory information, and a haptic interface for outputting haptic information.

The memory 170 can store data that supports various functions of the AI device 100. For example, the memory 170 can store input data acquired by the input interface 120, learning data, a learning model, a learning history, and the like.

The processor 180 can determine at least one executable operation of the AI device 100 based on information determined or generated by using a data analysis algorithm or a machine learning algorithm. The processor 180 can control the components of the AI device 100 to execute the determined operation.

To this end, the processor 180 can request, search, receive, or utilize data of the learning processor 130 or the memory 170. The processor 180 can control the components of the AI device 100 to execute the predicted operation or the operation determined to be desirable among the at least one executable operation.

When the connection of an external device is required to perform the determined operation, the processor 180 can generate a control signal for controlling the external device and can transmit the generated control signal to the external device.

The processor 180 can acquire intention information for the user input and can determine the user's requirements based on the acquired intention information.

The processor 180 can acquire the intention information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. At least one of the STT engine or the NLP engine can be learned by the learning processor 130, can be learned by the learning processor 240 of the AI server 200, or can be learned by their distributed processing.

The processor 180 can collect history information including the operation contents of the AI apparatus 100 or the user's feedback on the operation and can store the collected history information in the memory 170 or the learning processor 130 or transmit the collected history information to the external device such as the AI server 200. The collected history information can be used to update the learning model.

The processor 180 can control at least part of the components of AI device 100 so as to drive an application program stored in memory 170. Furthermore, the processor 180 can operate two or more of the components included in the AI device 100 in combination so as to drive the application program.

Figure 2:
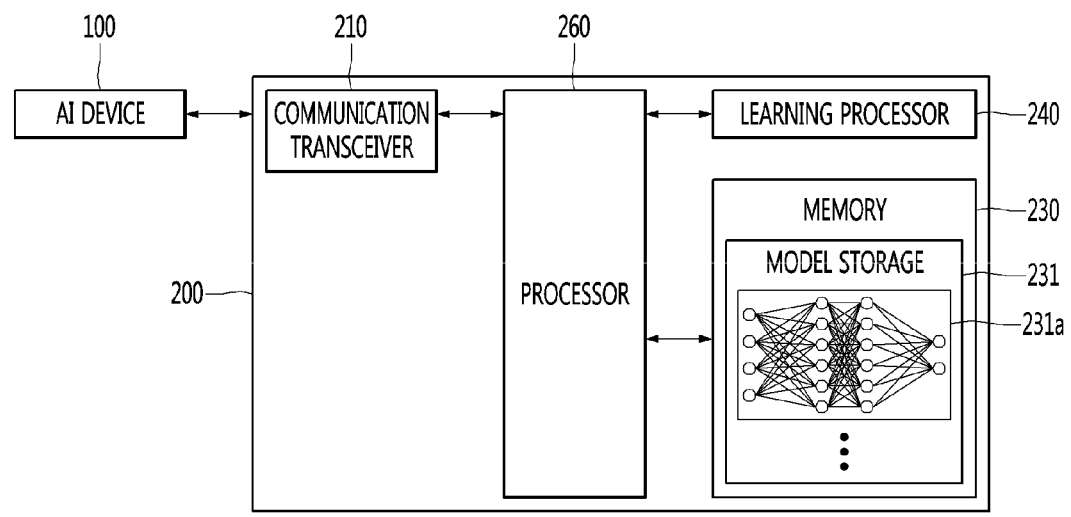
FIG. 2 illustrates an AI server connected to a robot according to an embodiment of the present disclosure.

FIG. 2 illustrates an AI server connected to a robot according to an embodiment of the present disclosure.

Referring to FIG. 2, the AI server 200 can refer to a device that learns an artificial neural network by using a machine learning algorithm or uses a learned artificial neural network. The AI server 200 can include a plurality of servers to perform distributed processing, or can be defined as a 5G network. At this time, the AI server 200 can be included as a partial configuration of the AI device 100, and can perform at least part of the AI processing together.

The AI server 200 can include a communication transceiver 210, a memory 230, a learning processor 240, a processor 260, and the like.

The communication transceiver 210 can transmit and receive data to and from an external device such as the AI device 100.

The memory 230 can include a model storage 231. The model storage 231 can store a learning or learned model (or an artificial neural network 231a) through the learning processor 240.

The learning processor 240 can learn the artificial neural network 231a by using the learning data. The learning model can be used in a state of being mounted on the AI server 200 of the artificial neural network, or can be used in a state of being mounted on an external device such as the AI device 100.

The learning model can be implemented in hardware, software, or a combination of hardware and software. If all or part of the learning models are implemented in software, one or more instructions that constitute the learning model can be stored in memory 230.

The processor 260 can infer the result value for new input data by using the learning model and can generate a response or a control command based on the inferred result value.

Figure 3:
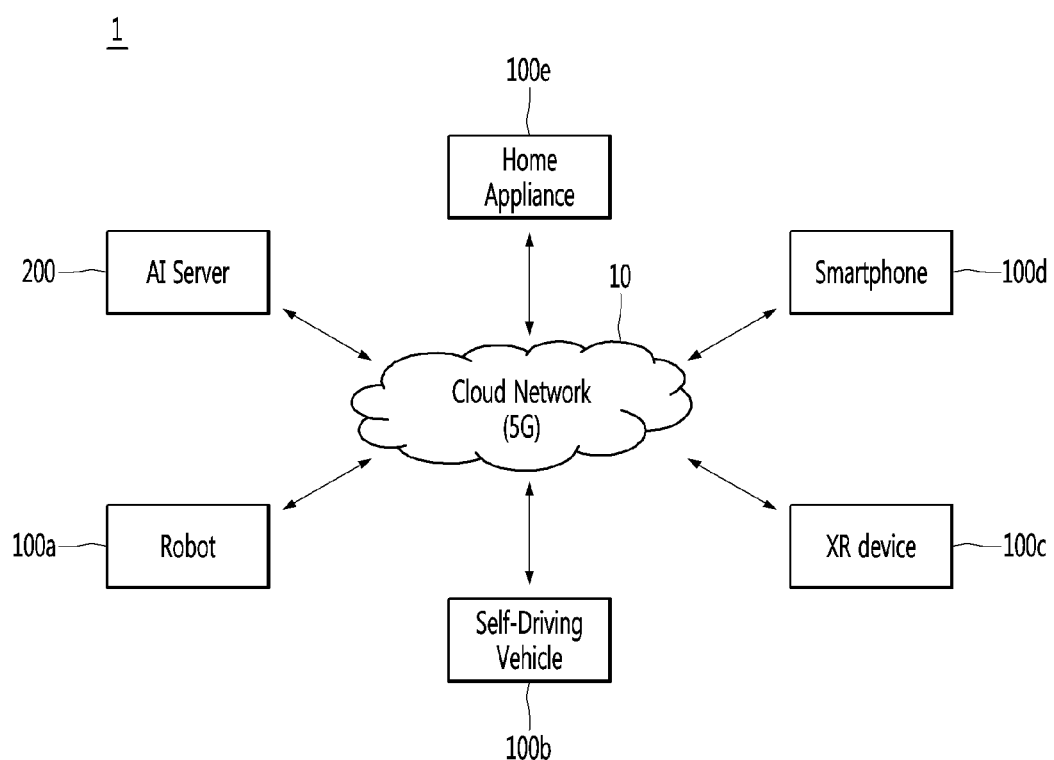
FIG. 3 illustrates an AI system including a robot according to an embodiment of the present disclosure.

FIG. 3 illustrates an AI system including a robot according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, can be referred to as AI devices 100a to 100e.

The cloud network 10 can refer to a network that forms part of a cloud computing infrastructure or exists in a cloud computing infrastructure. The cloud network 10 can be configured by using a 3G network, a 4G or LTE network, a 5G network or any other type of network.

That is, the devices 100a to 100e and 200 configuring the AI system 1 can be connected to each other through the cloud network 10. In particular, each of the devices 100a to 100e and 200 can communicate with each other through a base station, but can directly communicate with each other without using a base station.

The AI server 200 can include a server that performs AI processing and a server that performs operations on big data.

The AI server 200 can be connected to at least one of the AI devices constituting the AI system 1, that is, the robot 100a, the self-driving vehicle 100b, the XR device 100c, the smartphone 100d, or the home appliance 100e through the cloud network 10, and can assist at least part of AI processing of the connected AI devices 100a to 100e.

At this time, the AI server 200 can learn the artificial neural network according to the machine learning algorithm instead of the AI devices 100a to 100e, and can directly store the learning model or transmit the learning model to the AI devices 100a to 100e.

At this time, the AI server 200 can receive input data from the AI devices 100a to 100e, can infer the result value for the received input data by using the learning model, can generate a response or a control command based on the inferred result value, and can transmit the response or the control command to the AI devices 100a to 100e.

Alternatively, the AI devices 100a to 100e can infer the result value for the input data by directly using the learning model, and can generate the response or the control command based on the inference result.

Hereinafter, various embodiments of the AI devices 100a to 100e to which the above-described technology is applied will be described. The AI devices 100a to 100e illustrated in FIG. 3 can be regarded as a specific embodiment of the AI device 100 illustrated in FIG. 1.

The robot 100a, to which the AI technology is applied, can be implemented as a guide robot, a carrying robot, a cleaning robot, a wearable robot, an entertainment robot, a pet robot, an unmanned flying robot, or the like.

The robot 100a can include a robot control module for controlling the operation, and the robot control module can refer to a software module or a chip implementing the software module by hardware.

The robot 100a can acquire state information about the robot 100a by using sensor information acquired from various kinds of sensors, can detect (recognize) surrounding environment and objects (i.e. the environment may include the objects), can generate map data, can determine the route and the travel plan, can determine the response to user interaction, or can determine the operation.

The robot 100a can use the sensor information acquired from at least one sensor among the lidar, the radar, and the camera so as to determine the travel route and the travel plan.

The robot 100a can perform the above-described operations by using the learning model composed of at least one artificial neural network. For example, the robot 100a can recognize the surrounding environment and the objects by using the learning model, and can determine the operation by using the recognized surrounding information or object information. The learning model can be learned directly from the robot 100a or can be learned from an external device such as the AI server 200.

At this time, the robot 100a can perform the operation by generating the result by directly using the learning model, but the sensor information can be transmitted to the external device such as the AI server 200 and the generated result can be received to perform the operation.

The robot 100a can use at least one of the map data, the object information detected from the sensor information, or the object information acquired from the external apparatus to determine the travel route and the travel plan, and can control the driving unit such that the robot 100a travels along the determined travel route and travel plan.

The map data can include object identification information about various objects arranged in the space in which the robot 100a moves. For example, the map data can include object identification information about fixed objects such as walls and doors and movable objects such as chairs and desks. The object identification information can include a name, a type, a distance, and a position.

In addition, the robot 100a can perform the operation or travel by controlling the driving unit based on the control/interaction of the user. At this time, the robot 100a can acquire the intention information of the interaction due to the user's operation or speech utterance, and can determine the response based on the acquired intention information, and can perform the operation.

Figure 4:
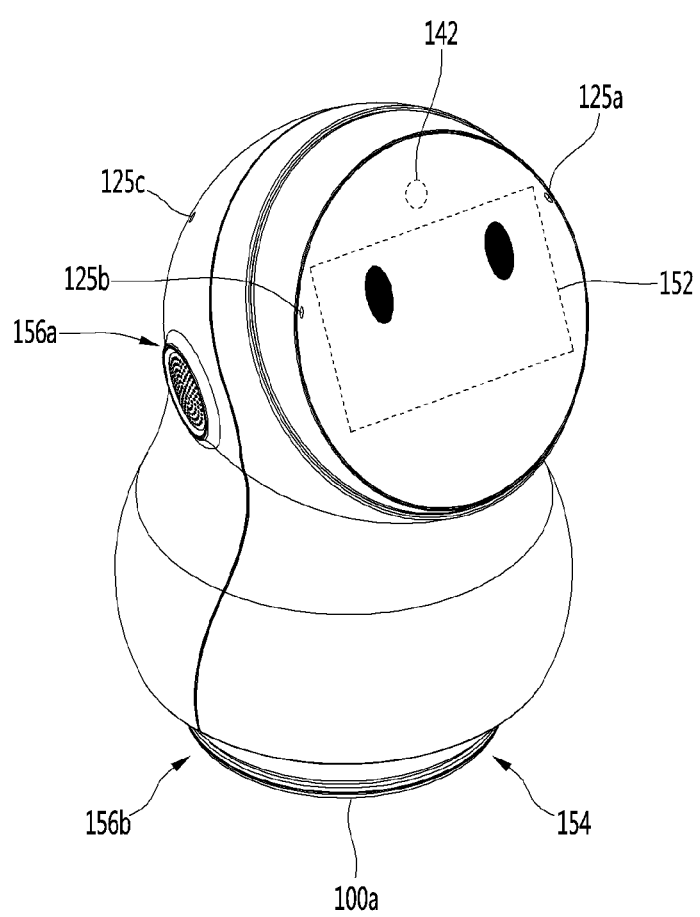
FIG. 4 is a perspective view of a robot according to an embodiment of the present disclosure.

FIG. 4 is a perspective view of a robot according to an embodiment of the present disclosure.

Referring to FIG. 4, the robot 100a can refer to a communication robot for providing information or content to a user through communication or interaction with the user or performing operation of inducing a particular action (e.g., a particular action of a user).

For example, the robot 100a can be a home robot disposed in the home or can be a robot 100a disposed at any location. Such a home root can perform an operation of providing various types of information or content to the user through interaction with a user or monitoring an event occurring in the home.

In order to perform the above-described operations, the robot 100a can include input/output units, such as a camera 142, for acquiring an image of a user (or another object) or an ambient image of a robot (e.g., immediate surroundings of the robot), at least one microphone 124 (see FIG. 5) for acquiring a user's speech or an ambient sound of the robot, a display 152 for outputting graphics or text, a sound output unit 154 (e.g., a speaker) for outputting speech or sound, and a light output unit 156 (see FIG. 5) for outputting light of a color or pattern mapped to a particular event or situation.

The robot 100a can include at least one microphone holes 125a to 125c formed in an outer surface of a cover (or a case), in order to smoothly acquire external sound of the robot through the at least one microphone 124 implemented therein. Each of the microphone holes 125a to 125c can be formed at a position corresponding to any one microphone 124, and the microphone 124 can communicate with the outside through the microphone holes 125a to 125c. Meanwhile, the robot 100a can include a plurality of microphones 124 spaced apart from each other. In this case, the robot 100a can detect a direction in which sound is generated using the plurality of microphones 124.

The display 152 can be disposed to face one surface from the robot 100a. Hereinafter, a direction that the display 152 faces is defined as a front side of the robot 100a. Meanwhile, although the sound output unit 154 is shown as being disposed at the lower portion of the robot 100a, the position of the sound output unit 154 can be variously changed according to embodiments.

The light output unit 156 is implemented as a light source such as a light emitting diode (LED) to represent the state or event of the robot 100a through a color or output pattern change. Although first light output units 156a disposed at both surfaces of the robot 100a (as shown in FIGS. 4, and 12-14) and a second light output unit 156b disposed at the lower portion of the robot 100a are shown in FIG. 4, the number of light output units 156 and the placement positions thereof can be variously changed.

The robot 100a can further include a movement unit (e.g., traveling unit) for moving the robot 100a from one position to another position. For example, the movement unit can include at least one wheel and a motor for rotating the wheel.

Figure 5:
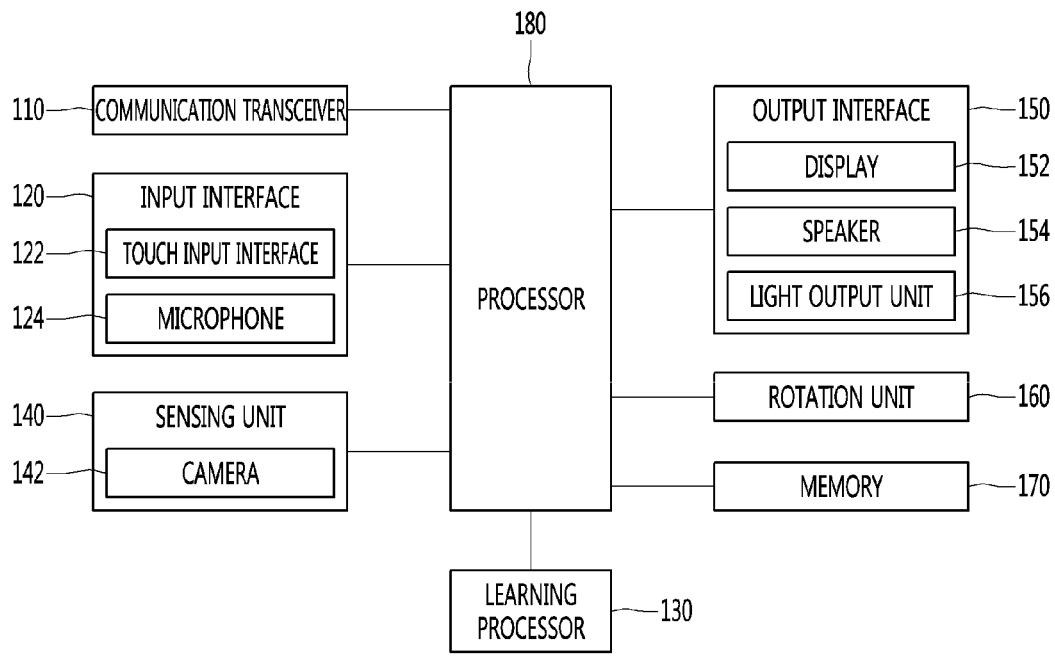
FIG. 5 is a block diagram showing the control configuration of a robot according to an embodiment of the present disclosure.

FIG. 5 is a block diagram showing the control configuration of a robot 100a according to an embodiment of the present disclosure.

Referring to FIG. 5, the robot 100a can include a communication transceiver 110, an input interface 120, a learning processor 130, a sensing unit 140, an output interface 150, a rotation unit 160, a memory 170 and a processor 180. The components shown in FIG. 4 are examples for convenience of description and the robot 100a can include more or fewer components than the components shown in FIG. 4.

Meanwhile, the description related to the AI device 100 of FIG. 1 is similarly applicable to the robot 100a of the present disclosure and thus a repeated description of FIG. 1 will be omitted.

The communication transceiver 110 can include communication modules for connecting the robot 100a with a server, a mobile terminal and/or another robot over a network. Each of the communication modules can support any one of the communication technologies described above with reference to FIG. 1.

For example, the robot 100a can be connected to the network through an access point, such as a router. Therefore, the robot 100a can provide various types of information acquired through the input interface 120 or the sensing unit 140 to the server or the mobile terminal over the network. In addition, the robot 100a can receive information, data, commands, etc., from the server or the mobile terminal.

The input interface 120 can include at least one input part for acquiring various types of data. For example, the at least one input part can include a physical input interface such as a button or a dial, a touch input interface 122, such as a touchpad or a touch panel, and a microphone 124 for receiving user's speech or ambient sound of the robot 100a, but is not limited thereto (e.g., may include additional inputs). The user can input various types of requests or commands to the robot 100a through the input interface 120.

The sensing unit 140 can include at least one sensor for sensing a variety of ambient information of the robot 100a. For example, the sensing unit 140 can include a camera 142 and various sensors such as a proximity sensor, an illuminance sensor, a touch sensor and a gyro sensor (gyroscope), or the like.

The camera 142 can acquire the ambient image of the robot 100a. In some embodiments, the processor 180 can acquire an image including a user's face through the camera 142 to recognize the user or to acquire the gesture or facial expression of the user.

The proximity sensor can detect that an object such as a user approaches the robot 100a. For example, when approaching of the user is detected by the proximity sensor, the processor 180 can output an initial screen or initial speech through the output interface 150, thereby inducing the user to use the robot 100a.

The illuminance sensor can detect the brightness of a space in which the robot 100a is disposed. The processor 180 can control the components to perform various operations based on the result of detection of the illuminance sensor and/or time-of-day information.

The touch sensor can detect that a portion of the body of the user is brought into contact with a predetermined area of the robot 100a.

The gyro sensor can detect the rotation angle or the slope of the robot 100a. The processor 180 can recognize a direction that the robot 100a faces or detect external impact based on the result of detection of the gyro sensor.

The output interface 150 can output various types of information or content related to operation or state of the robot 100a or various types of services, programs or applications executed in the robot 100a. In addition, the output interface 150 can output various types of messages or information for performing interaction with the user.

The output interface 150 can include the display 152, the speaker 154 and the light output unit 156.

The display 152 can output the above-described various types of information, messages or content in the form of graphics. In some embodiments, the display 152 can be implemented as a touchscreen along with the touch input interface 122. In this case, the display 152 can perform an input function as well as an output function.

The speaker 154 can output the various types of information, messages or content in the form of speech or other sound.

The light output unit 156 can be implemented as a light source, such as an LED. The processor 180 can represent the state of the robot 100a through the light output unit 156. In some embodiments, the light output unit 156 is an auxiliary output unit and can provide various types of information to the user along with the display 152 and/or the speaker 154.

The rotation unit 160 can include a first motor for rotating the robot 100a about a vertical axis. The processor 180 can control the first motor included in the rotation unit 160 to rotate the robot 100a, thereby changing the direction that the display 152 and the camera 142 of the robot 100a face in a left-and-right direction.

In some embodiments, the rotation unit 160 can further include a second motor for tilting the robot 100a by a predetermined angle in a forward-and-backward direction. The processor 180 can control the second motor to tilt the robot 100a, thereby changing a direction that the display 152 and the camera 142 face in an upward-and-downward direction.

Various types of data such as control data for controlling operation of the components included in the robot 100a, data for performing operation based on information acquired through the input interface 120 or information acquired through the sensing unit 140, etc., can be stored in the memory 170.

In addition, program data of software modules or applications executed by at least one processor or controller included in the processor 180 can be stored in the memory 170.

The memory 170 can include various storage devices such as a ROM, a RAM, an EEPROM, a flash drive, a hard drive, etc., in hardware.

The processor 180 can include at least one processor or controller for controlling operation of the robot 100a. For example, the processor 180 can include at least one of a CPU (or multiple CPUs), application processor (AP), microcomputer, integrated circuit, application specific integrated circuit (ASIC), etc.

Figure 6:
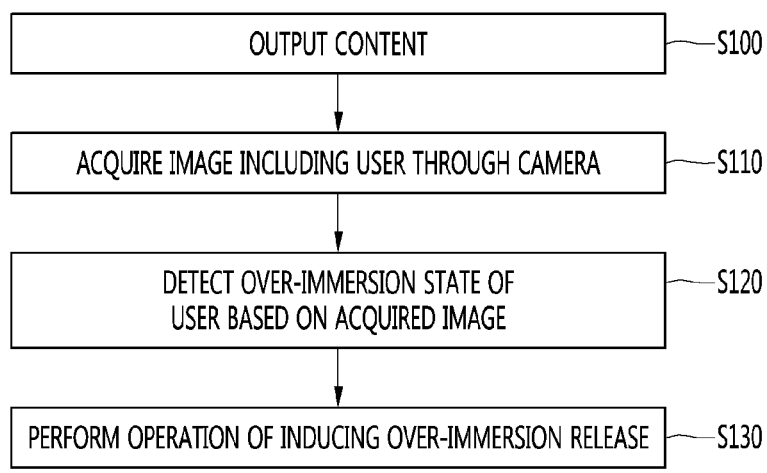
FIG. 6 is a flowchart illustrating a control operation of a robot according to an embodiment of the present disclosure.

FIG. 6 is a flowchart illustrating a control operation of a robot according to an embodiment of the present disclosure.

Referring to FIG. 6, the robot 100a can output content through the output interface 150 (S100).

For example, the processor 180 can receive an output request of content from the user through the input interface 120.

In response to the received output request, the processor 180 can output content in the form of graphics and/or sound through the display 152 and/or the speaker 154, respectively.

While content is output, the robot 100a can acquire an image including the user through the camera 142 (S110).

When the content is output through the robot 100a, the user is highly likely to view the display 152 from the front (e.g., from a front of the robot 100a).

As in the embodiment of FIG. 4, when the display 152 and the camera 142 face the same direction, the processor 180 can acquire the image including the user (the face of the user) through the camera 142.

In some embodiments, when the camera 142 is adjustable to face the direction different from that of the display 152, the processor 180 can adjust the camera 142 to face the same direction as the display 152.

The processor 180 can continuously drive the camera 142 to acquire a video including the user.

Alternatively, the processor 180 can control driving of the camera 142 to acquire a still image including the user at predetermined periods (e.g., predetermined time periods).

The robot 100a can detect the over-immersion state of the user based on the acquired image (S120).

For example, the processor 180 can recognize (e.g., estimate) the emotion (e.g., emotional state) of the user from the acquired image and detect the over-immersion state of the user based on the recognized emotion.

Alternatively, the processor 180 can recognize the user's gaze from the acquired image and detect the over-immersion state based on the recognized gaze.

Alternatively, the processor 180 can measure the number of eye blinks of the user during a reference time and detect the over-immersion state of the user based on the measured number of eye blinks.

Detection of the over-immersion state will be described in greater detail below with reference to FIGS. 8 to 11.

In some embodiments, the processor 180 can acquire the speech of the user through the microphone 124 when content is output. In this case, the processor 180 can detect the over-immersion state of the user using the acquired image and speech.

When the over-immersion state is detected, the robot 100a can perform operation of inducing over-immersion release of the user (S130).

For example, the processor 180 can induce the user to perform an operation which is not related to the content, thereby enabling over-immersion release of the user.

Alternatively, the processor 180 can output a message for inducing the user to take a rest, thereby enabling over-immersion release of the user (e.g., release of the over-immersion state of the user).

Alternatively, the processor 180 can include the first motor and/or the second motor included in the rotation unit 160 to rotate and/or tilt the robot 100a, thereby calling attention of the user to enable over-immersion release.

Alternatively, the processor 180 can transmit, to the terminal of a manager (or a guardian), a notification indicating that the user is in the over-immersion state, thereby inducing the manager to release over-immersion of the user.

Figure 7:
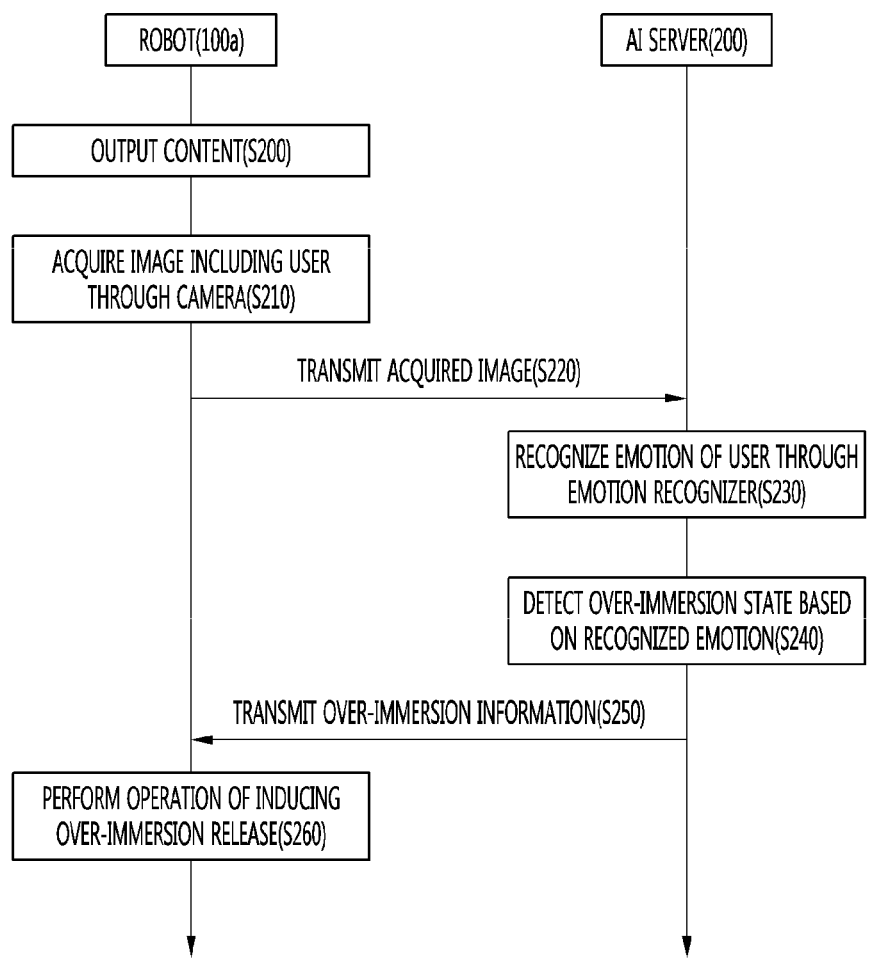
FIG. 7 is a ladder diagram showing an embodiment of over-immersion detection and over-immersion release induction operation of a user using a robot and an AI server connected thereto.

FIG. 7 is a ladder diagram showing an embodiment of over-immersion detection and over-immersion release induction operation of a user using a robot and an AI server connected thereto.

In some embodiments, operation of detecting the over-immersion state of the user can be performed by a server (e.g., the AI server 200 of FIG. 2) connected to the robot 100a.

Referring to FIG. 7, steps S200 and S210 can be substantially equal to steps S100 and S110 of FIG. 6 and thus a description thereof will be omitted.

The robot 100a can transmit the image acquired through the camera 142 to the AI server 200 (S220).

The processor 180 can transmit video data acquired through the camera 142 to the AI server 200 in real time.

Alternatively, the processor 180 can extract still image data from the video data acquired through the camera 142 at predetermined periods and transmit the extracted still image data to the AI server 200.

Alternatively, the processor 180 can acquire the still image data through the camera 142 at predetermined periods and transmit the acquired still image data to the AI server 200.

The AI server 200 can recognize the emotion of the user from the image received from the robot 100a through an emotion recognizer mounted therein (S230).

The emotion recognizer can include a plurality of recognizers trained to recognize the emotion (or sensibility) of the user included in input data.

The processor 260 of the AI server 200 can input the image (or images) received from the robot 100a as input data of the emotion recognizer. The emotion recognizer can recognize the emotion of the user from the input image (or images).

The emotion recognizer will be described in greater detail below with reference to FIG. 8.

In some embodiments, the robot 100a can acquire the speech of the user through the microphone 124 while content is output. In this case, the processor 260 of the AI server 200 can recognize the emotion of the user using the emotion recognizer, from the image(s) and/or speech received from the robot 100a.

The AI server 200 can detect the over-immersion state based on the recognized emotion (S240), and transmit, to the robot 100a, over-immersion detection information based on the result of detection (S250).

The processor 260 can detect the over-immersion state based on the result of recognition of the emotion recognizer.

For example, the processor 260 can detect that the user is in the over-immersion state, when the emotion recognized by the emotion recognizer is identical during a reference time or more.

In some embodiments, the processor 260 can detect that the user is in the over-immersion state, when a particular emotion level is recognized as being equal to or greater than a predetermined level.

The processor 260 can transmit the over-immersion detection information to the robot 100*a*, when the over-immersion state of the user is detected. For example, the over-immersion detection information can include information indicating that the user is in the over-immersion state.

The robot 100*a* can perform an operation of inducing over-immersion release based on the received over-immersion detection information (S260).

Figure 8:
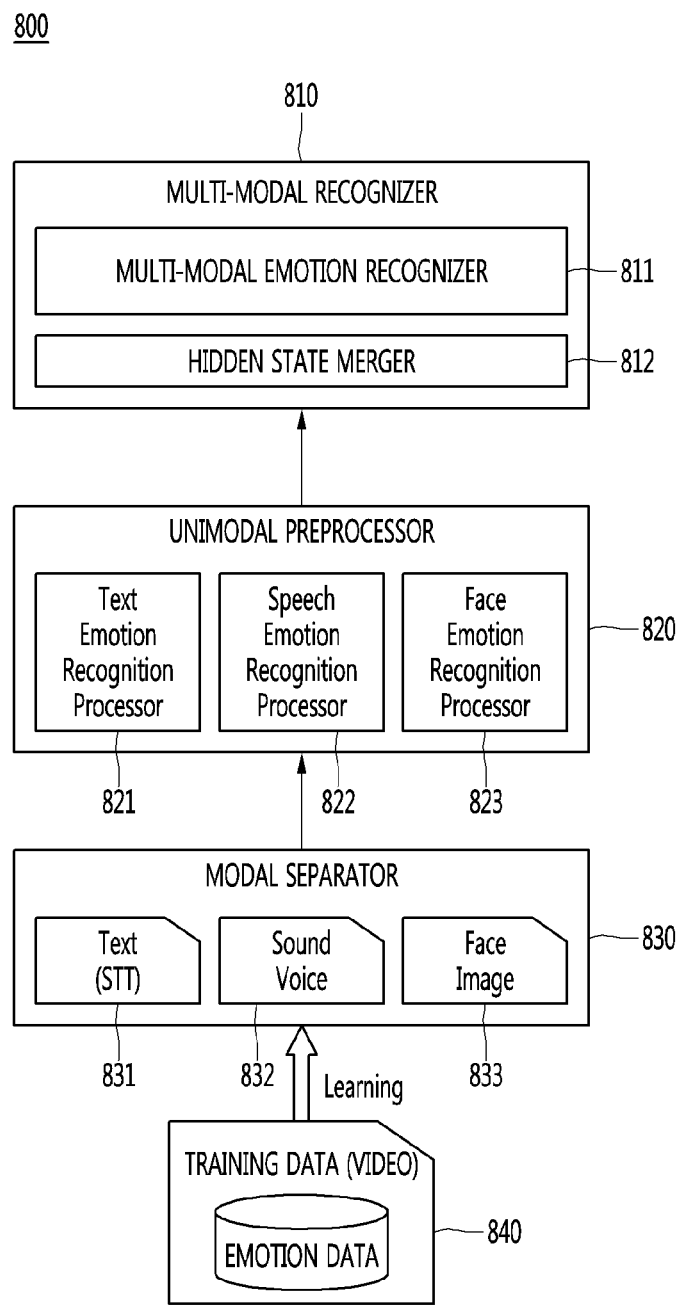
FIG. 8 is a simplified internal block diagram of an emotion recognizer according to an embodiment of the present disclosure.

FIG. 8 is a simplified internal block diagram of an emotion recognizer according to an embodiment of the present disclosure.

Referring to FIG. 8, the emotion recognizer 800 may be included in the robot 100*a* or the AI server 200 and can perform deep learning using emotion data as input data 840.

The emotion recognizer 800 according to the embodiment of the present disclosure can include a unimodal preprocessor 820 including a plurality of per-modal recognizers 821, 822 and 823 trained to recognize the emotion information of the user included in unimodal input data, and a multimodal recognizer 810 trained to merge output data of the plurality of per-modal recognizers 821, 822 and 823 and recognize emotion data of the user included in the merged data.

The emotion data is emotion information data having information on the emotion of the user and can include image, speech, bio signal data, which is emotion information used for emotion recognition. Preferably, the input data 840 can be video data including the face of the user. More preferably, the input data 840 can further include audio data including the speech of the user.

Emotion is the nature of mind that accepts a sensory stimulus or an impression or an ability to feel about a stimulus, is an internal high-dimensional psychological experience of a human to physical stimulus from the outside or environmental change in sensibility economics, and is defined as a complex emotion such as comfort or discomfort.

In this specification, emotion can mean feelings, such as comfort and discomfort, caused with respect to a stimulus and emotion can be recognized as any one of N representative emotional states. The N representative emotional states can be referred to as emotion classes.

For example, the emotion recognizer 800 can recognize six representative emotion classes, including but not limited to surprise, happiness, sadness, displeasure, anger, and fear, and output one of the representative emotion classes as an emotion recognition result or output a probability value of each of the six representative emotion classes.

Alternatively, the emotion recognized and output by the emotion recognizer 800 according to the embodiment of the present disclosure can further include a neutrality emotion class indicating a default emotional state in which six emotions do not occur, in addition to the emotion classes such as surprise, happiness, sadness, displeasure, anger, and fear.

In this case, the emotion recognizer 800 can output any one emotion class selected from surprise, happiness, sadness, displeasure, anger, fear and neutrality as an emotion recognition result or output a probability value of each emotion class such as surprise a %, happiness b %, sadness c %, displeasure d %, anger e %, fear f % or neutrality g % as an emotion recognition result.

When the emotion of the user is recognized using an artificial intelligence model that performs deep learning with respect to emotion to be recognized, a tagging value of data used during deep learning is output as a result value.

Meanwhile, in a real environment, the user may not show only one emotion. For example, although the user expresses joy through speech, displeasure can be expressed in a facial expression. As such, people can show different emotions according to modals such as speech, image or text.

Accordingly, when the emotion of the user can be recognized to finally output one emotion value or different emotion, contradictory emotion, similar emotion, etc., of each of speech, image and text is ignored, an emotion different from the actual emotion of the user can be recognized.

In order to recognize and manage each emotion based on all the information on the user, which is revealed to the outside, the emotion recognizer 800 according to the embodiment of the present disclosure can have a structure capable of recognizing emotion for each unimodal of each of voice, image and text and recognizing emotion through a multi-modal.

That is, the emotion recognizer 800 according to the embodiment of the present disclosure can recognize the emotion of the user, which is input at a particular time point, for each unimodal and, at the same time, recognize emotion through a multi-modal.

Meanwhile, each of the plurality of per-modal recognizers 821, 822 and 823 recognizes and process one input unimodal input data and can be referred to as a unimodal recognizer.

The emotion recognizer 800 according to the embodiment of the present disclosure can generate the plurality of unimodal input data, by separating the input data 840 for each unimodal. A modal separator 830 can separate the input data 840 into a plurality of unimodal input data.

Here, the plurality of unimodal input data can include image unimodal input data, sound unimodal input data and text unimodal input data separated from video data including the user.

For example, the input data 840 can be video data in which the user is captured, and the video data can include video data in which the user's face is captured and audio data including the speech of the user.

In this case, the modal separator 830 can separate the data into text unimodal input data 831 obtained by converting the content of the audio data included in the input data 840 into text data and sound unimodal input data 832 of audio data, such as sound tone, magnitude, pitch, etc.

The text unimodal input data 831 can be data obtained by converting the speech separated from the video data into text. The sound unimodal input data 832 can be the sound source file of the audio file or a file obtained by performing preprocessing such as noise removal with respect to the sound source file.

In addition, the modal separator 830 can separate the image unimodal input data 833 including one or more face image data from the video data included in the input data 840.

Meanwhile, the separated unimodal input data 831, 832 and 833 can be input to the unimodal preprocessor 820 including the plurality of per-modal recognizers 821, 822 and 823 trained to recognize the emotion information of the user based on the unimodal input data 831, 832 and 833.

For example, the text unimodal input data 831 can be input to the text emotion recognizer 821 for performing deep learning using text as training data.

The sound unimodal input data 832 can be input to the speech emotion recognizer 822 for performing deep learning using sound as training data.

The image unimodal input data 833 including one or more face image data can be input to the face emotion recognizer 823 for performing deep learning using the image as learning data.

The text emotion recognizer 821 can recognize a vocabulary, a sentence structure, etc., included in sound-to-text (STT) data to recognize the emotion of the user. For example, as words related to happiness are frequently used or as words having a higher degree of happiness are recognized, the probability value of the happiness emotion class is greater than those of the other emotion classes. Alternatively, the text emotion recognizer 821 can immediately output happiness which is the emotion class corresponding to the recognized text, as an emotion recognition result.

In addition, the text emotion recognizer 821 can also output a text feature point vector along with the emotion recognition result.

The speech emotion recognizer 822 can extract feature points of input speech data. At this time, the speech feature points can include the tone, volume, waveform, etc., of the speech. The speech emotion recognizer 822 can detect the tone of the speech to determine the emotion of the user.

In addition, the speech emotion recognizer 822 can output the emotion recognition result and the detected speech feature point vectors.

The face emotion recognizer 823 can detect the face area of the user from the input image data and recognize expression landmark point information which is feature points configuring the facial expression, thereby recognizing the expression of the user. In addition, the face emotion recognizer 823 can output the emotion class corresponding to the recognized expression or the probability value of each emotion class and can also output the face feature point (expression landmark point) vector.

Meanwhile, the plurality of per-modal recognizers can include an artificial neural network corresponding to the input characteristics of input unimodal input data. In addition, the multi-modal emotion recognizer 811 can also include an artificial neural network corresponding to the characteristics of the input data.

For example, the face emotion recognizer 823 for performing image based learning and recognition can include a convolutional neural network (CNN), the other emotion recognizers 821 and 822 can include a deep neural network (DNN), and the multi-modal emotion recognizer 811 can include an artificial neural network of a recurrent neural network (RNN).

The per-modal emotion recognizers 821, 822 and 823 can recognize the emotion information included in the input unimodal input data 831, 832 and 833 to output the emotion recognition result. For example, the per-modal emotion recognizers 821, 822 and 823 can output an emotion class having a highest probability among a predetermined number of preset emotion classes as the emotion recognition result or output the probability value of each emotion class as the emotion recognition result.

Meanwhile, the per-modal emotion recognizers 821, 822 and 823 can learn and recognize text, speech and image in each deep learning structure and derive an intermediate vector composed of a feature point vector of each unimodal.

In addition, the multi-modal recognizer 810 can perform multi-modal deep learning with the intermediate vector of each speech, image and text.

Since the input of the multimodal recognizer 810 is generated based on the output of the per-modal emotion recognizers 821, 822 and 823, the per-modal emotion recognizers 821, 822 and 823 can operate as preprocessors.

Meanwhile, the emotion recognizer 800 according to the embodiment of the present disclosure can use a total of four deep learning models including deep learning models of three per-modal emotion recognizers 821, 822 and 823 and a deep learning model of one multi-modal recognizer 810.

Meanwhile, the multi-modal recognizer 810 can include a merger (hidden state merger) 812 for merging feature point vectors output from the plurality of per-modal recognizers 821, 822 and 823 and a multi-modal emotion recognizer 811 trained to recognize the emotion information of the user included in the output data of the merger 812.

Here, the merger 812 can synchronize the output data of the plurality of per-modal recognizers 821, 822 and 823 and vector-concatenate and output the feature point vectors to the multi-modal emotion recognizer 811.

The multi-modal emotion recognizer 811 can recognize the emotion information of the user from the input data to output the emotion recognition result.

For example, the multi-modal emotion recognizer 811 can output an emotion class having a highest probability among the predetermined number of preset emotion classes as the emotion recognition result or output the probability value of each emotion class as the emotion recognition result.

Therefore, the emotion recognizer 800 according to the embodiment of the present disclosure can output a plurality of unimodal emotion recognition results and one multi-modal emotion recognition result.

The emotion recognizer 800 according to the embodiment of the present disclosure can output a plurality of unimodal emotion recognition results and one multi-modal emotion recognition result as an emotion class level (probability).

For example, the emotion recognizer 800 can output the probability of each emotion class of surprise, happiness, sadness, displeasure, anger, and fear. As the probability value increases, the possibility of being a recognized emotion class increases. Here, the sum of the probability values of seven types of emotion classes can be 100%.

The emotion recognizer 800 can output a complex emotion recognition result including the respective emotion recognition results 821, 822 and 823 of the plurality of per-modal recognizers and the emotion recognition result of the multi-modal recognizer 811.

Therefore, the robot 100 can provide emotional interchange user experience (UX) based on three unimodal emotion recognition results and one multi-modal emotion recognition result.

According to settings, the emotion recognizer 800 can output a recognition result occupying a majority in the complex emotion recognition result and a recognition result having a highest probability value as a final recognition result. Alternatively, the processor 180 of the robot 100a or the processor 260 of the AI server 200, which has received the plurality of emotion recognition results, can determine the final recognition result according to a predetermined criterion.

The emotion recognizer 800 according to the present disclosure can recognize and manage the emotion of each of speech (speech tone, etc.), image (facial expression, etc.) and text (content of speech) as levels. Therefore, it is possible to differently process emotional interchange user experience (UX) according to modal.

In addition, the per-unimodal (speech, image and text) emotion recognition results and the multi-modal emotion recognition result can be simultaneously output based on one time point. Since it is possible to recognize the emotion using the speech, image and text input at one time point in a complex manner, it is possible to recognize contradictory emotion for each unimodal from the multi-modal emotion and to determine the emotion propensity of the user. Therefore, even if negative input is received in some modal, the overall emotion can be recognized to provide emotion interchange user experience (UX) corresponding to positive input which is the real emotional state of the user.

According to the present disclosure, the robot 100a can communicate with the emotion recognizer 800 or the AI server 200 including the emotion recognizer 800, thereby recognizing the unimodal emotion of the user.

In addition, the emotion recognizer 800 can analyze the emotion pattern of the user and can be used for emotional care (treatment) with per-modal emotion recognition.

In a related art emotion method, it is difficult to analyze the emotion by mapping the emotion to one in the case of contradictory emotion in which the per-modal recognition results of the input data are different.

However, according to the emotion recognizer 800, it is possible to most suitably deal with various real-life situations through several inputs and outputs.

In order to complement an input recognizer having low performance, the emotion recognizer 800 can configure a recognizer structure in which the plurality of unimodal recognizers 811, 821 and 823 complements each other in a fusion manner of several inputs and outputs.

The emotion recognizer 800 according to the embodiment of the present disclosure can separate the speech into sound and meaning and make a total of three inputs including image, speech (sound) and STT from the image and speech inputs.

In addition, in order to obtain optimal performance for each of three inputs, the emotion recognizer 800 can be configured to have different artificial neural network models for each input, such as a convolutional neural network (CNN) and a long short-term memory (LSTM). For example, the image based recognizer 823 can have a CNN structure and the multi-modal emotion recognizer 811 can have a long short-term memory (LSTM) structure. Therefore, a neural network customized to each input characteristic can be configured.

The outputs of the unimodal recognizers 821, 822 and 823 for each input can be a probability value of seven types of emotion classes and a vector value of feature points expressing this emotion well.

The multi-modal recognizer 810 can connect vector values of feature points expressing emotions well through a fully-connected layer and an LSTM instead of calculating emotional values of three inputs using a statistical method, thereby helping performance improvement in a manner in which a problem that it is difficult for one recognizer to solve is solved by another recognizer and covering various cases in real life.

For example, even when speech is only heard at a place where it is difficult to recognize a face, the speech based recognizers 821 and 822 and the multi-modal emotion recognizer 811 can recognize the emotion of the user in the emotion recognizer 800 according to the embodiment of the present disclosure.

In addition, since the emotion recognizer 800 can recognize the complex emotional state of the user by fusing the recognition results of image, speech and text data and the multi-modal recognition result, it is possible to perform emotion recognition with respect to various situations in real life.

According to the embodiment of the present disclosure, based on the emotion recognition result of the emotion recognizer 800, over-immersion of the user who uses content through the robot 100a can be detected.

Figure 9:
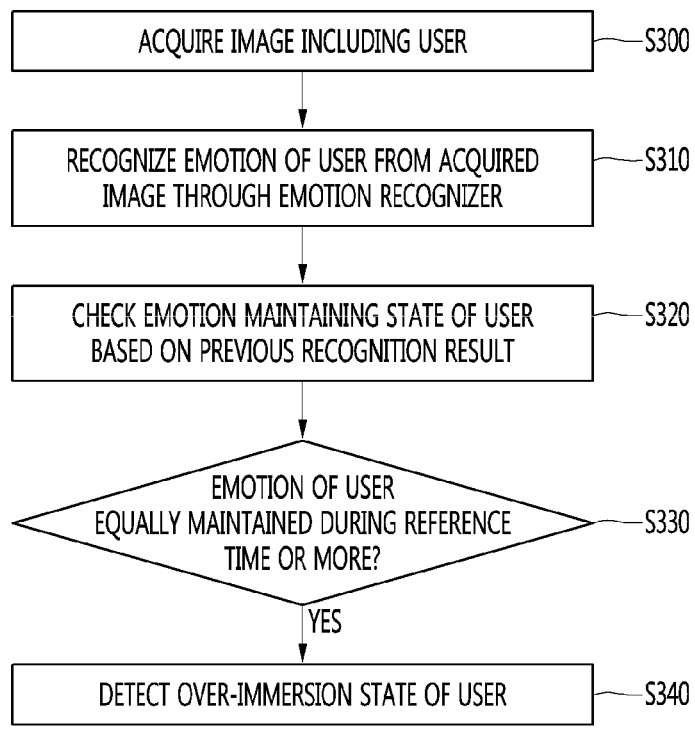
FIG. 9 is a flowchart illustrating a method of detecting over-immersion of a user using an emotion recognizer according to an embodiment.

FIG. 9 is a flowchart illustrating a method of detecting over-immersion of a user using an emotion recognizer in greater detail.

Referring to FIG. 9, the robot 100a can acquire an image including a user through the camera 142 while content is output (S300).

The robot 100a or the AI server 200 can recognize the emotion of the user from the acquired image through the emotion recognizer 800 (S310).

The robot 100a or the AI server 200 can be periodically or continuously recognize the emotion of the user from the acquired image.

The robot 100a or the AI server 200 can check the emotion maintaining state of the user based on a previous recognition result (S320).

The robot 100a or the AI server 200 can determine whether the emotion of the user is equally maintained based on the periodically or continuously acquired recognition result.

When the emotion of the user is recognized as being equally maintained during a reference time or more (YES of S330), the robot 100a or the AI server 200 can detect that the user is currently in the over-immersion state (S340).

When the user is excessively immersed in the content, the facial expression may not be changed or a certain emotional state can be continuously maintained.

Therefore, the robot 100a or the AI server 200 can detect that the user is in the over-immersion state with respect to the content when the emotion of the user recognized from the image including the face of the user is equal during a reference time or more.

Figure 10:
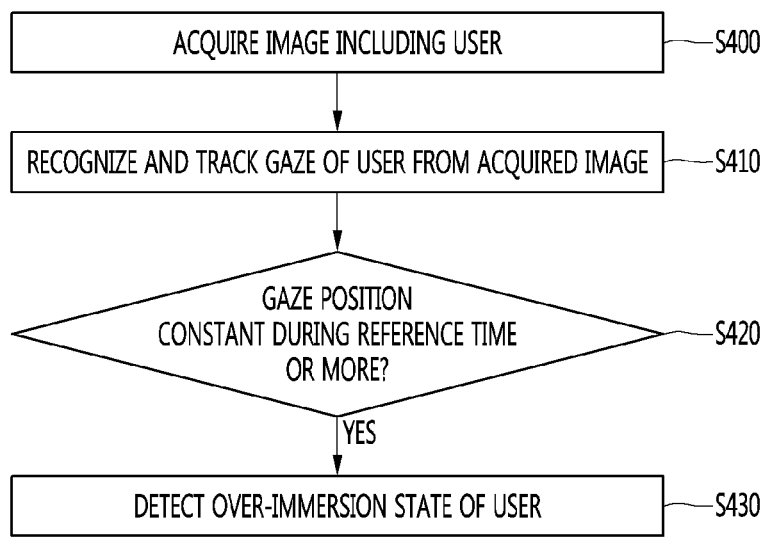
FIG. 10 is a flowchart illustrating an over-immersion detection method based on a user's gaze.
Figure 11:
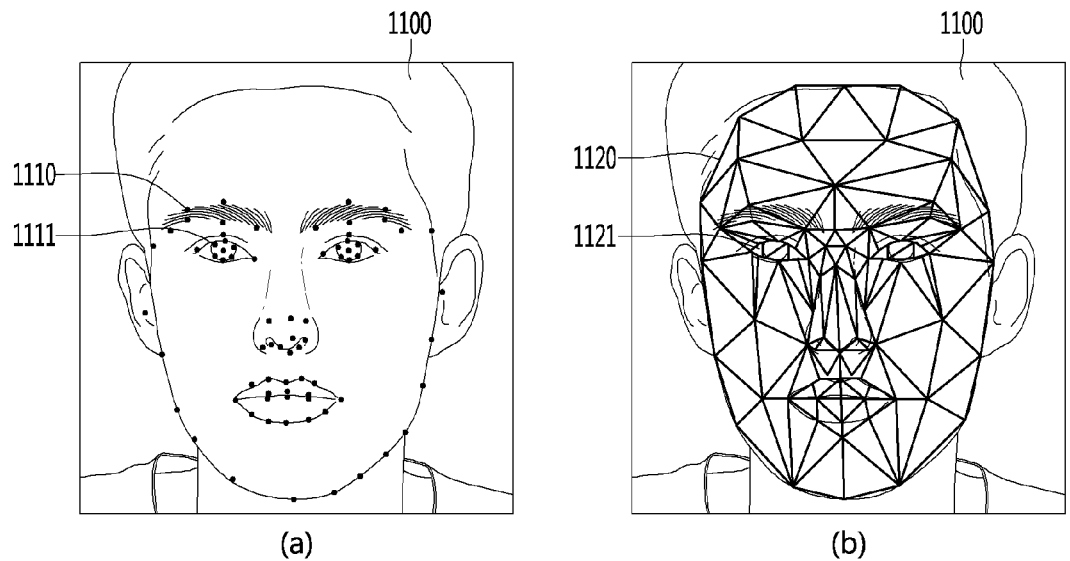
FIG. 11 is a view showing an example related to the embodiment of FIG. 10.

FIG. 10 is a flowchart illustrating an over-immersion detection method based on a user's gaze. FIG. 11 is a view showing an example related to the embodiment of FIG. 10.

Referring to FIG. 10, the robot 100a can acquire an image including a user through the camera 142 while content is output (S400).

The robot 100a or the AI server 200 can recognize and track the gaze of the user from the acquired image (S410).

Referring to (a) and (b) of FIG. 11, the robot 100a or the AI server 200 can recognize the face of the user from the image using various face recognition schemes or algorithms.

For example, the robot 100a or the AI server 200 can acquire the coordinates 1110 of the feature points of the face of the user 1100 from the image and recognize the pupil area 1111 of the user 1100 based on the acquired coordinates 1110, as shown in (a) of FIG. 11.

Alternatively, the robot 100a or the AI server 200 can extract the feature points 1120 of the face of the user 1100 from the image and recognize the pupil area 1121 of the user based on the extracted feature points 1120, as shown in (b) of FIG. 11. Technologies or algorithms related to face recognition are well known and thus a detailed description thereof will be omitted.

The robot 100a or the AI server 200 can periodically or continuously detect the positions of the recognized pupil areas 1111 and 1121, thereby tracking the gaze direction of the user.

The robot 100a or the AI server 200 can detect the gaze position based on the result of tracking the gaze. When the detected gaze position is constant during a reference time or more (YES of S420), the robot 100a or the AI server 200 can detect that the user is currently in the over-immersion state (S430).

Generally, when the user is in the over-immersion state with respect to the content output on the display 152, the gaze direction of the user can be fixed to the display 152.

Therefore, the robot 100a or the AI server 200 can detect that the user is in the over-immersion state, upon detecting that the gaze position is constant during the reference tome or more.

In some embodiments, the robot 100a or the AI server 200 can detect the over-immersion state in association with the content output on the display 152.

Specifically, the robot 100a or the AI server 200 can acquire display position change information of a predetermined GUI (for example, a character, etc.) included in the content output on the display 152 of the robot 100a, and compare the position change of the GUI with the gaze position change of the user. The robot 100a or the AI server 200 can detect that the user is in the over-immersion state, when the position change of the GUI corresponds to the gaze position change of the user during a reference time or more.

Meanwhile, the robot 100a or the AI server 200 can detect the over-immersion state of the user, by applying any one of the embodiment of FIG. 9 or the embodiment of FIG. 10. Alternatively, the robot 100a or the AI server 200 can detect the over-immersion state of the user, by applying the embodiment of FIG. 9 and the embodiment of FIG. 10 in parallel.

In some embodiments, the robot 100a or the AI server 200 can measure the number of eye blinks of the user from the acquired image (video) during a reference time. For example, the robot 100a or the AI server 200 can measure the number of eye blinks of the user, by calculating the number of times that the pupil areas 1111 and 1121 of the image disappear as the user blinks. The robot 100a or the AI server 200 can detect that the user is in the over-immersion state, when the measured number of eye blinks is equal to or less than (or less than) a reference number.

That is, the robot 100a or the AI server 200 according to the embodiment of the present disclosure can efficiently detect over-immersion by recognizing the emotion, the gaze or the number of eye blinks from the image of the user.

Figure 12:
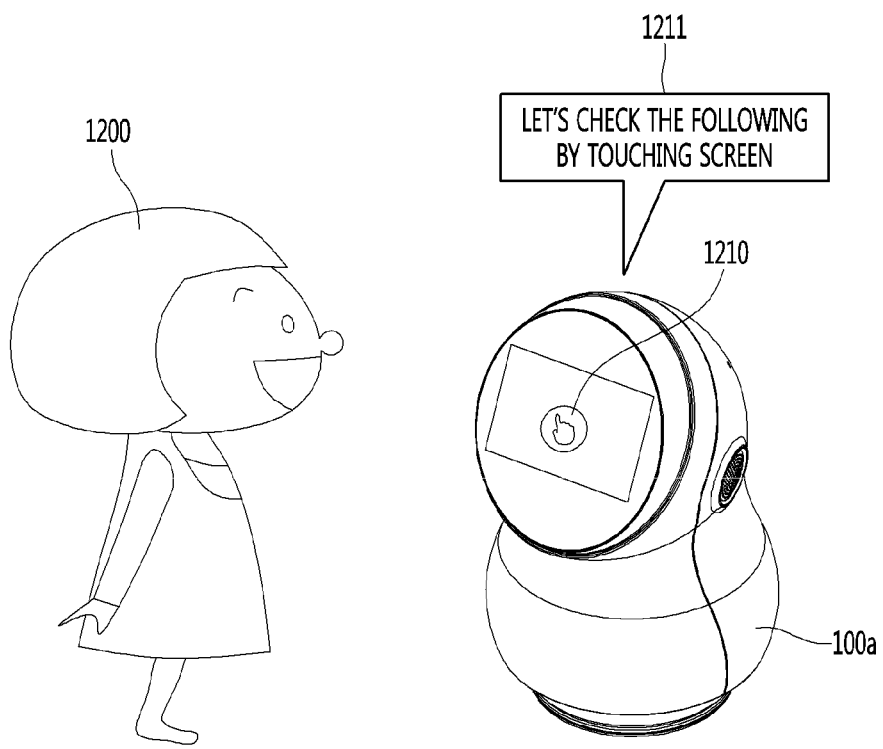
FIGS. 12 to 14 are views showing examples of over-immersion release induction operation of a robot according to an embodiment of the present disclosure.
Figure 13:
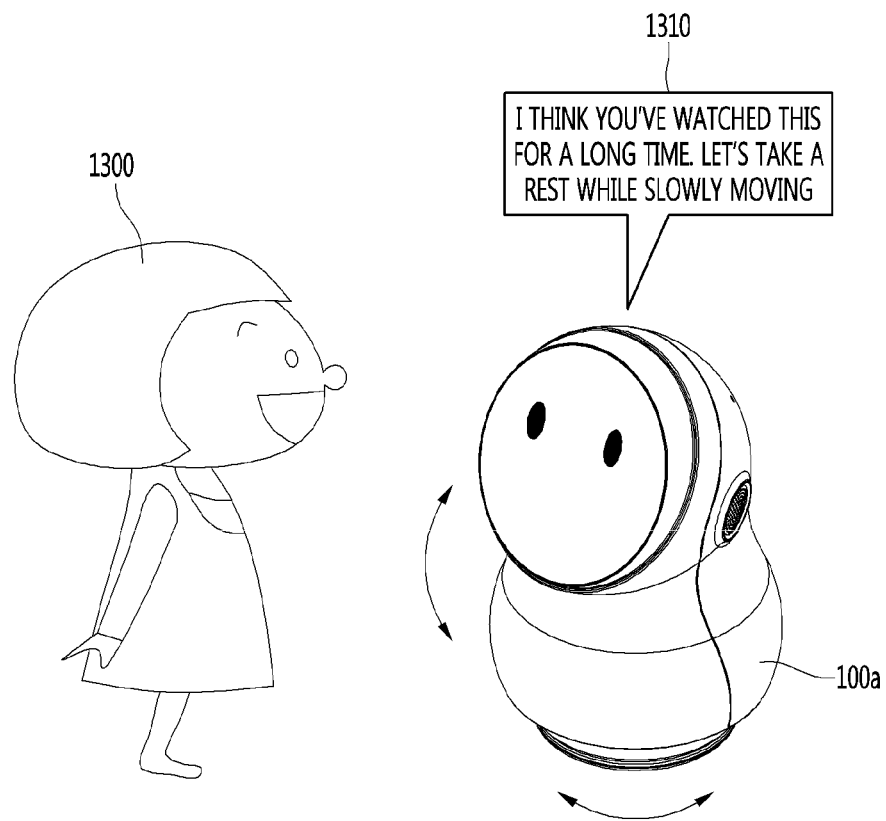
Figure 14:
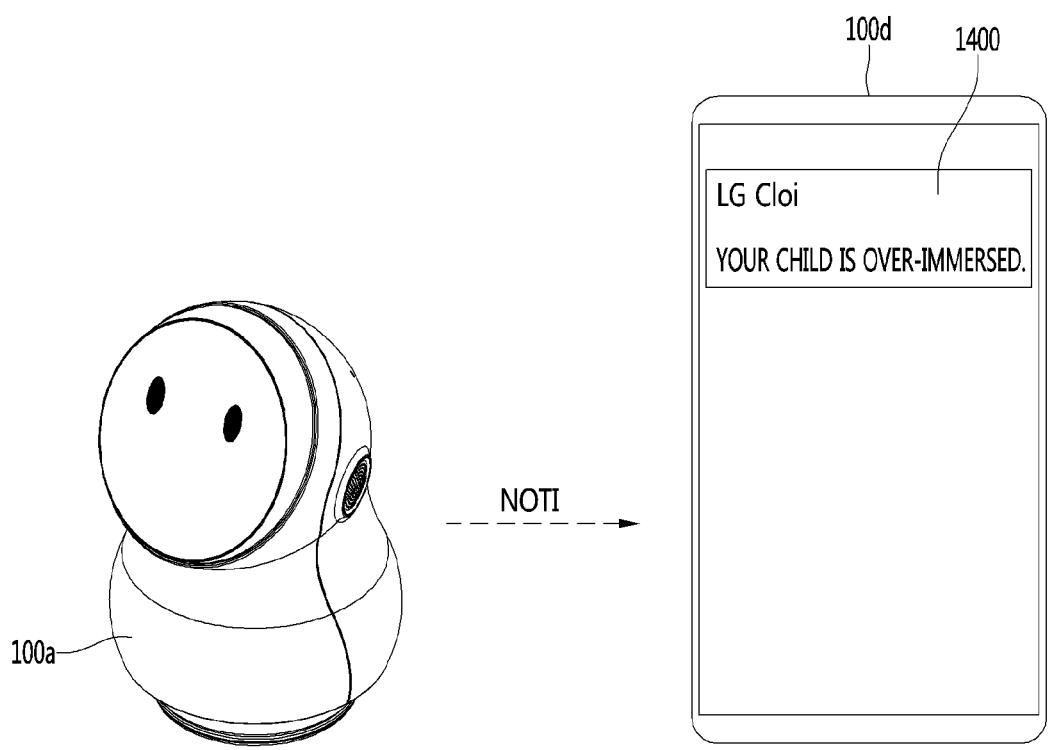

FIGS. 12 to 14 are views showing examples of over-immersion release induction operation of a robot according to an embodiment of the present disclosure.

The robot 100a can perform operation of inducing over-immersion release of the user, upon detecting that the user is currently in the over-immersion state.

Referring to FIG. 12, the processor 180 can output a touch item 1210 on the display 152, and output a message 1211 through the speaker 154 for inducing a user 1200 to touch the touch item 1210.

At this time, the processor 180 can stop provision of the content which is being output through the display 152 and output the touch item 1210. When touch input of the touch item 1210 is received, the processor 180 can resume output of the content.

Alternatively, the processor 180 can overlap and display the touch item 1210 on the content screen while outputting the content through the display 152. When touch input of the touch item 1210 is received, the processor 180 can stop display of the touch item 1210 and continuously output the content.

That is, the robot 100a can call the attention of the user, by inducing the user to perform operation (touch operation) which is not related to the content, when the over-immersion state of the user 1200 is detected.

Referring to FIG. 13, the processor 180 can control the rotation unit 160 (the first motor and/or the second motor) to rotate or tilt the robot 100a. By rotation or tilting of the robot 100a, the position of the display 152 on which the content is being output can be changed. As the position of the display 152 is changed, it is possible to call the attention of the user 1300 which is watching the content and, as a result, to release the over-immersion state of the user 1300.

In some embodiments, the processor 180 can output a message 1310 for inducing the user 1300 to take a rest through the speaker 154.

For example, the processor 180 can control the rotation unit 160 to rotate and/or tilt the robot 100a, while outputting a message 1310 for inducing the user 1300 to move, in order to solve (e.g., reduce or minimize) body stiffness of the user 1300 due to over-immersion. The user 1300 can be released from the over-immersion state, by moving their body according to the message 1310 and the movement of the robot 100a.

That is, the robot 100a can release the over-immersion state of the user, by moving the robot 100a or inducing movement of the user, when the over-immersion state of the user 1300 is detected.

Referring to FIG. 14, the processor 180 can transmit a notification NOTI indicating that the user is in the over-immersion state to the terminal 100d of a manager (e.g., a guardian (parent), etc.) through the communication transceiver 110.

The terminal 100d can display a notification window 1400 indicating that the user is in the over-immersion state, in response to the received notification NOTI. The manager can check the displayed notification window 1400 to recognize that the user is in the over-immersion state and perform operation of releasing the over-immersion state of the user.

In addition to the embodiments of FIGS. 12 to 14, the robot 100a can perform operation of releasing the over-immersion state of the user in various manners. Therefore, the robot 100a can minimize side effects caused to the user by over-immersion in content which is being outputted.

According to the embodiments of the present invention, the robot can efficiently detect the over-immersion state of the user for the content from the image acquired through the camera. The robot can minimize side effects caused to the user, by performing operation of releasing the over-immersion state of the user when the over-immersion state is detected.

In addition, the robot can more accurately detect the over-immersion of the user, by accurately recognizing the emotion of the user through an artificial intelligence based emotion recognizer.

The foregoing description is merely illustrative of the technical idea of the present disclosure, and various changes and modifications can be made by those skilled in the art without departing from the essential characteristics of the present disclosure.

Therefore, the embodiments disclosed in the present disclosure are to be construed as illustrative and not restrictive, and the scope of the technical idea of the present disclosure is not limited by these embodiments.

The scope of the present disclosure should be construed according to the following claims, and all technical ideas within equivalency range of the appended claims should be construed as being included in the scope of the present disclosure.

What is claimed is:

1. A robot comprising:
an output interface including at least one of a display and a speaker;
a camera;
at least one first motor configured to rotate the output interface;
at least one emotion recognizer trained to recognize emotion of a user from input data through deep learning; and
a processor configured to:
control the output interface to output content to the display or to the speaker,
control the camera to capture at least one image the user watching the content while the content is output,
detect an over-immersion state of the user based on an emotion result of the at least one emotion recognizer using the at least one image as the input data, and
when the over-immersion state is detected, release the over-immersion state of the user to control driving of the at least one first motor to rotate the output interface for releasing over-immersion of the user.

2. The robot of claim 1, wherein the input data of the at least one emotion recognizer further comprises text data obtained from a speech of the user and audio data of the user including at least one of tone, volume, waveform, magnitude and pitch of the audio data.

3. The robot of claim 2, further comprising a multi-modal emotion recognizer to output the emotion result through multi-modal deep learning based on an output of the at least one emotion recognizer,
wherein the emotion recognizer includes at least one recognizer implemented through deep learning.

4. The robot of claim 1, wherein the processor periodically or continuously recognizes the emotion of the user from the captured at least one image through the at least one emotion recognizer, the at least one image includes a video or a plurality of still images captured at predetermined time points.

5. The robot of claim 4, wherein the processor is further configured to:
detect that the user is in an over-immersion state of the content when the recognized emotion remains the same during a reference time.

6. The robot of claim 1, wherein the processor is further configured to:
track a gaze of the user from the at least one image, and
detect that the user is in the over-immersion state based on a result of tracking.

7. The robot of claim 6, wherein the processor detects that the user is in the over-immersion state, upon detecting that a position of the gaze is constant during a reference time.

8. The robot of claim 6, wherein the output interface includes the display,
wherein the content includes a graphical user interface (GUI) output through the display, and
wherein the processor is further configured to:
acquire display position change information of the GUI,
track a gaze of the user to determine a gaze position change of the user, and
when a position change of the GUI based on the acquired display position change information corresponds to the gaze position change of the user, detect that the user is in the over-immersion state.

9. The robot of claim 1, wherein the processor is further configured to:
measure a number of eye blinks of the user from the at least one image during a reference time, and
when the measured number of eye blinks is less than a reference number, determine that the user is in the over-immersion state.

10. The robot of claim 1, further comprising a communication transceiver for connecting the robot to a server,
wherein the processor is further configured to:
transmit the at least one image to the server through the communication transceiver,
when the over-immersion state of the user is detected by the server, receive over-immersion detection information from the server, and
control the operation of releasing the over-immersion state of the user in response to the received over-immersion detection information.

11. The robot of claim 1, wherein, wherein the output interface includes the display and the speaker, and
wherein the release of the over-immersion of the state of the user includes:
displaying a touch item on the display, and
outputting a message through the speaker for inducing touch by the user of the touch item.

12. The robot of claim 1, further comprising at least one second motor configured to tilt the output interface of the robot,
wherein, when the over-immersion state is detected, the processor is further configured to control driving of the at least one second motor to tilt the output interface of the robot.

13. The robot of claim 1, further comprising a communication transceiver for connection with a terminal,
wherein, when the over-immersion state is detected, the processor transmits, to the terminal, a notification indicating that the user is in an over-immersion state.

14. A method of controlling a robot including a camera and at least one of a display and a speaker, the method comprising:
outputting content through the at least one of the display and the speaker;
capturing at least one image of a user watching the content through the camera while the content is output;
detecting an over-immersion state of the user based on an emotion result of at least one emotion recognizer performing deep learning using the captured at least one image as input data; and
after the over-immersion state is detected, releasing over-immersion of the user through driving of at least one first motor to rotate the output interface or at least one second motor to tilt the output interface.

15. The method of claim 14, wherein the detecting of the over-immersion state includes:
recognizing emotion of the user through the deep learning using at least one of the at least one captured image, audio data of the user and text data obtained from a speech of the user as the input data; and
recognizing the over-immersion state of the user based on the emotion result obtained through multi-modal deep learning based on an output of the deep learning.

16. The method of claim 15, wherein the detecting of the over-immersion state based on the recognized emotion includes detecting that the user is in an over-immersion state, when the recognized emotion according to the emotion result remains the same during a reference time or more.

17. The method of claim 14, wherein the detecting of the over-immersion state includes:

tracking a gaze of the user watching the content from the at least one image; and detecting the over-immersion state based on a result of tracking.

18. The method of claim 17, wherein the detecting of the over-immersion state based on the result of tracking includes detecting that the user is in an over-immersion state, upon detecting that a position of the gaze of the user is constant during a reference time.

19. The method of claim 17, wherein the output interface includes the display, wherein the content includes a graphical user interface (GUI) output through the display, and wherein the detecting of the over-immersion state based on the result of tracking includes:

acquiring display position change information of the GUI;

comparing a position change of the GUI based on the acquired display position change information with a gaze position change of the user detected according to the tracking of the gaze; and when the position change of the GUI corresponds to the gaze position change during a reference time as a result of comparison, detecting that the user is in the over-immersion state.

20. The method of claim 14, wherein the controlling of operation of releasing the over-immersion state further includes at least one of:

displaying a touch item through the display and outputting a message through the speaker for inducing touch of the touch item by the user;

inducing the user to perform an operation which is not related to the content or transmitting, to a terminal, a notification indicating that the user is in an over-immersion state.

* * * * *